UNITED STATES PATENT OFFICE.

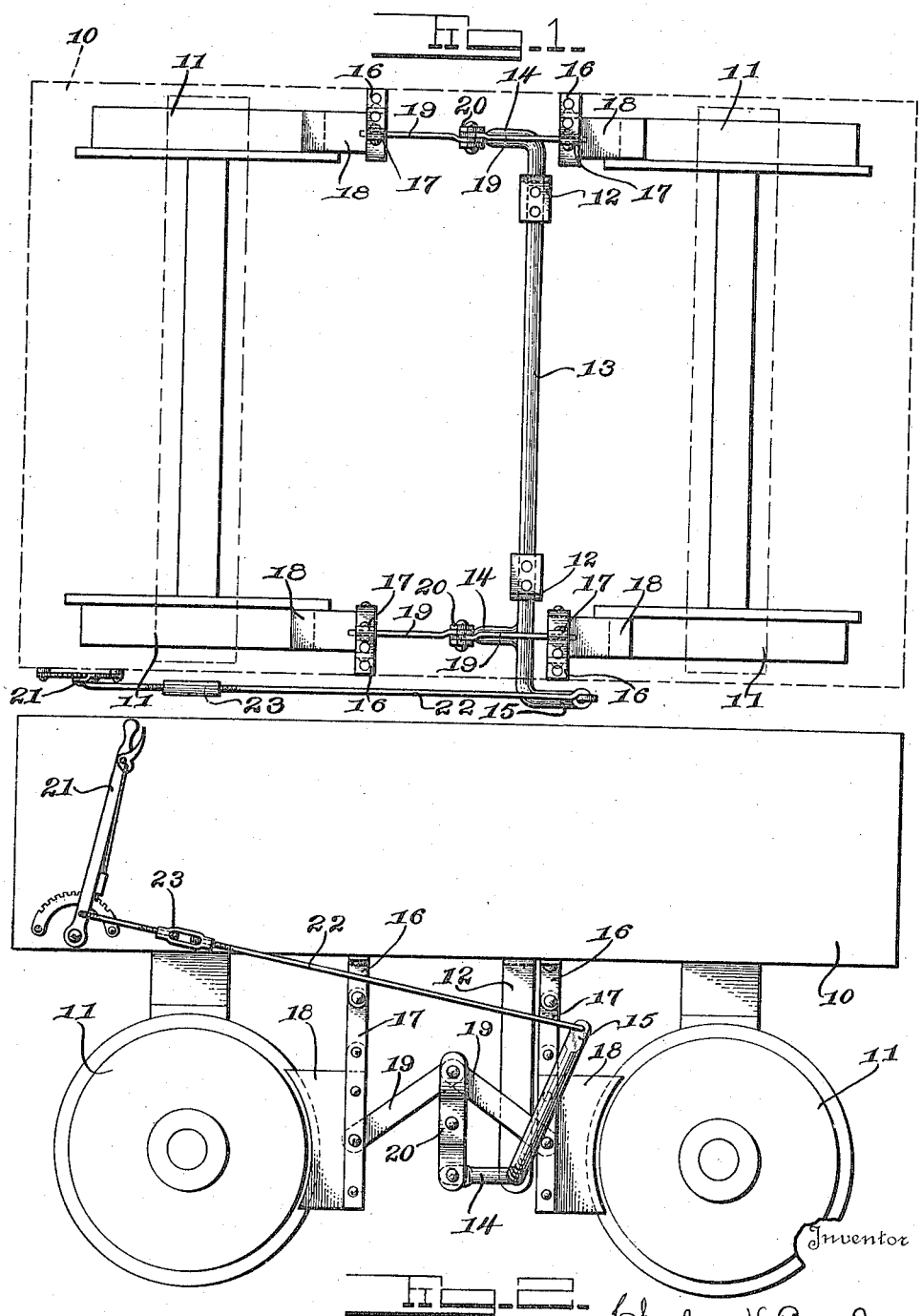

CHARLES H. BOARDMAN, OF VIVIAN, WEST VIRGINIA.

CAR-BRAKE.

1,161,598.  Specification of Letters Patent.  Patented Nov. 23, 1915.

Application filed April 9, 1915. Serial No. 20,261.

*To all whom it may concern:*

Be it known that I, CHARLES H. BOARDMAN, of Vivian, in the county of McDowell and State of West Virginia, have invented certain new and useful Improvements in Car-Brakes, of which the following is a specification.

This invention is an improved brake for railway cars of the type employed in mines, and other places where similar cars are useful, although it is not limited in its application to any particular form or style of car.

One of the objects of the invention is to provide a brake particularly applicable to a four-wheel car and so constructed that all four wheels will be engaged at the same time and with substantially the same pressure.

A further object is to provide a brake of this character in which the brake shoes are instantly disengaged from the wheels, when the braking pressure is relieved, so as to avoid dragging on the wheels when a braking action is not required.

The invention will be hereinafter fully set forth and particularly pointed out in the claims.

In the accompanying drawing: Figure 1 is a diagrammatic plan view illustrating a car with the invention applied thereto. Fig. 2 is a side view thereof.

Referring to the drawing, 10 designates the frame of the car, and 11 the wheels, which may be of any suitable form, and attached to the frame by means of axles and bearings in the usual and well known way. Depending from the frame 10 are hangers 12, which rotatably support a shaft 13 provided with parallel crank arms 14, and a longer crank arm 15. The crank arm 15 is located at one end of the shaft, and is preferably made by bending the body of the shaft in the desired direction, and one of the crank arms 14 is located at the other end of the shaft, and made in the same manner. The other crank arm 14 is located near the crank arm 15, and made integral with the shaft.

Pivotally mounted at one end in depending brackets 16, are brake arms 17, provided with brake shoes 18, there being one brake shoe for each of the wheels 11. The brake arms on each side of the car are connected by toggle members 19, the joint of the toggle members being connected to the crank arms 14 by means of a link or operating member 20, which depends from the joint of the toggle members. The shaft 13 is located in a plane below the toggle members and the latter are of such length that they are always in the form of an inverted V, the brake blocks being forced into engagement with the wheels, by a rocking movement of the shaft 13 in a direction to exert a downward pull upon the operating member 20. The crank arm 15 is connected to a brake lever 21, by means of a connecting rod 22, the length of which may be adjusted by means of a turn buckle 23. The brake lever is pivoted to any suitable portion of the car frame.

In operation, when it is desired to set the brake, the brake lever 21 is moved on its pivot in a direction away from the brake, thereby rocking shaft 13 so as to exert a downward pull upon the operating member 20. This movement tends to straighten the toggle members 19, causing the brake shoes to engage all of the wheels at the same time, and with the same pressure. When it is desired to release the brake, the lever 21 is moved in the opposite direction, thereby imparting a rotation to the shaft 13 which will force the operating member 20 upward, thereby positively moving the brake shoes away from the wheels, so that there can be no drag upon the latter, when the pressure is off. From the foregoing it will be understood that the brake shoes are moved positively in both directions, and are held in either position by force-applied to the brake lever.

Having thus explained the nature of my invention, and described an operative manner of constructing and using the same, although without attempting to set forth all of the forms in which it may be made, or all of the forms of its use, what I claim is:—

1. A brake of the character described, comprising depending pivoted arms, brake shoes carried by the lower ends of said arms, toggle members connecting said arms, depending hangers supported independently of said arms, a rock shaft rotatably supported in said hangers below the plane of the toggle members, connections between said shaft and said toggle members, and means for rocking said shaft to draw said toggle members downwardly to move the brake shoes toward the wheels with which they are associated.

2. A brake shoe of the character described, comprising depending pivoted arms, brake shoes carried by the lower ends of said arms, toggle members connecting said arms, depending hangers supported independently of said arms, a shaft rotatably supported in said hangers below the plane of said toggle members, connections between said shaft and said toggle members, a crank arm on one end of said shaft, an operating lever, and a connecting rod between said operating lever and said crank arm.

3. A brake of the character described, comprising depending pivoted arms, brake shoes carried by the lower ends of said arms, toggle members connecting said arms, depending hangers supported independently of said arms, a shaft rotatably supported in said hangers below the plane of said toggle members and provided at one end with a long crank arm and at the other end with a short crank arm, said shaft being also provided with a second short crank arm located near the long arm, connections between said short crank arms and said toggle members, and an operating lever connected to the long crank arm.

In testimony whereof I have affixed my signature, in presence of two witnesses.

CHARLES H. BOARDMAN.

Witnesses:
J. M. HUDDLESTON,
W. E. SULT.

Copies of this patent may be obtained for five cents each, by addressing the "Commissioner of Patents, Washington, D. C."